Dec. 1, 1942.                A. B. LOW                2,304,004
                           COFFEE MAKER
                        Filed April 7, 1941

INVENTOR.
ARTHUR B. LOW
BY Martin E. Anderson
ATTORNEY.

Patented Dec. 1, 1942

2,304,004

UNITED STATES PATENT OFFICE 2,304,004

COFFEE MAKER

Arthur B. Low, Denver, Colo.

Application April 7, 1941, Serial No. 387,115

9 Claims. (Cl. 53—3)

This invention relates to improvements in coffee makers.

It is the object of this invention to produce a coffee maker of a very simple construction that can be manufactured at a low cost and which can be readily made of any desired capacity.

Another object is to produce a coffee maker of such construction and design that it can be readily and thoroughly cleaned.

A further object is to produce a coffee maker by means of which coffee can be brewed in a very short time.

A still further object is to produce a coffee maker that can be used with any vessel, pot or pan, of any material, either metal, glass, porcelain or enamel ware and which can be employed with the main container portion of most percolators.

The above and any other object that may become apparent as this description proceeds are attained by means of a construction and an arrangement of parts that will now be described in detail, and for this purpose, reference will be had to the accompanying drawing in which the invention has been illustrated in its preferred form, and in which.

Figure 1:
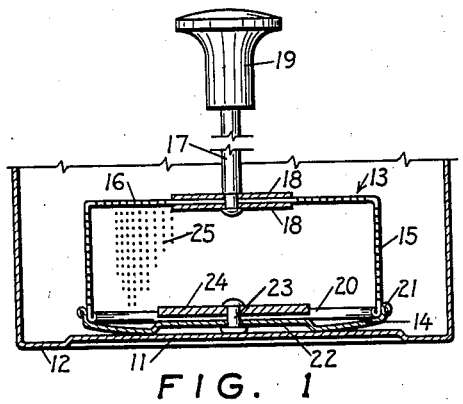
Figure 1 is a diametrical cross section through a container and through the coffee maker, forming part of this invention.

In the drawing reference numeral 10 designates a container such as an ordinary coffee pot and which contains the water employed in making the coffee. This container in the form illustrated in Figure 1 is provided with a substantially flat bottom portion 11 surrounded by a downwardly projecting annular area 12. Positioned within the container 10 is a coffee maker comprising a cup-like basket portion 13 and a removable closure 14. In the form illustrated, the basket 13 is of circular shape, but it may be of any other desired shape. However, for the purpose of this explanation, a circular shape will be assumed. In the embodiment illustrated, the basket, as well as the closure is constructed from perforated sheet metal. The cylindrical sides of the basket have been designated by reference numeral 15 and the flat top portion, when viewed as in Figure 1, by reference numeral 16. The top is provided with a central opening for the reception of the lower end of a handle 17 which extends through the opening in the manner shown. Washer-like weights 18 are positioned above and below the top 16, and the lower end of the handle passes through the three thicknesses of metal and is held in place by the means illustrated. The handle extends upwardly to a length of substantially five and one-half inches, when associated with a basket having a diameter of about three and one-quarter inches. A knob 19 of some plastic material is attached to the upper end of the handle. The lower edge of the cylindrical wall 15 is rolled inwardly as shown at 20 and the basket is provided with the removable closure 14 that has an upwardly extending wal or flange 21, which engages the outer surface of the basket with a friction fit. The closure in the form illustrated in Figure 1 has a spherical curvature and is provided on its inner surface with an upwardly or inwardly extending depression which has been designated by reference numeral 22. In the embodiment of this invention as now constructed, this depression is about three thirty-seconds of an inch deep and one and seven-eighths inches in diameter, and is concentric with the circular wall 21. The closure is provided at the center of depression 22 with an opening through which the rivet 23 extends. Positioned within the basket so as to rest on the upper surface of the depressed portion is a circular weight 24 that is rigidly attached to the inner end of the rivet 23. It will be observed that the rivet is of such length that when the coffee maker rests on a flat surface, the weight will be raised a short distance above the supporting surface of the closure.

Let us now assume that the container 10 is filled with water to a point above the top of the coffee maker and that the latter contains ground coffee, and let us assume that the container 10 is positioned above a gas flame or some other heating appliance. The depression 22 or the space between the bottom of the coffee maker and the top of the supporting portion of the container is filled with water and when this reaches a certain temperature, it will first give off any occluded air or gas it may contain and when the temperature reaches the boiling point, steam will be generated. The steam and gas will try to escape and in doing so they will raise the under surface of the closure away from the bottom of the container and when the pressure is relieved, the coffee maker will settle into the position shown, whereupon more steam will be generated, thereby causing it again to move up and down or to rock and as long as the water is maintained at a boiling temperature, the coffee maker will continue to move, due to the action of the escaping steam. The handle 17 and the ornamental knob 19 serve as an inertia pendulum that retards the rocking motion slightly when the water extends to some distance along the handle. The weights 18 and 24 are so proportioned that they will overcome any tendency of the basket to float. Dry ground coffee is lighter than water and until the grounds have been thoroughly wetted, there is a tendency for them to float, which tendency is decreased as they become saturated with water. During the boiling or heating of the water, upwardly directed currents of water and gas are also produced, which tend to lift the basket from the bottom of the container and the weights are therefore necessary to stabilize the coffee maker.

It will be observed that when the coffee maker is in the position shown in Figure 1, weight 24 is supported on the bottom 11 of the container 10, but as the coffee maker rocks, weight 24 is free to move downwardly and it will therefore reciprocate once during each rocking operation. The reciprocating action of weight 24 serves to agitate the coffee within the basket and to increase the circulation of the water about the grains of coffee, thereby shortening the time necessary to extract the coffee essence. Under certain circumstances, it may be desirable to have the weight 24 rigidly attached to the closure and in case this is done, the agitating action above described will not be present. If weight 24 is not movably connected as shown, the coffee and water within the coffee maker will be agitated due to the rocking motion in the same way as clothes are agitated in certain types of washing machines. Attention is called to the fact that the bottom of the closure which contacts with the bottom 11 of the container is slightly spherical and this has the following results: It permits the parts to rock more easily than if the annular surface surrounding the depression were a plane surface; in case the supporting bottom 11 is not a plane, but downwardly concave, the contact will still be made adjacent the periphery of the depression; if the supporting bottom 11 is convex upwardly, the sealing will still take place approximately along the lines shown in Figure 1.

Figure 2:
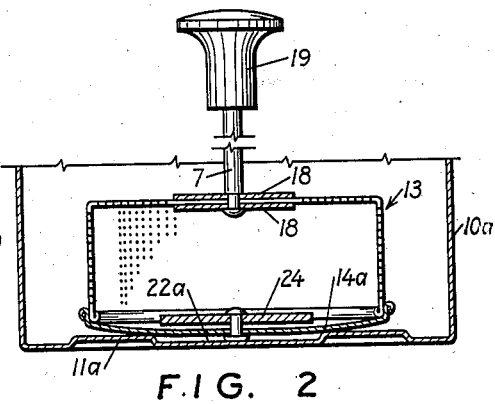
Figure 2 is a diametrical cross section similar to that shown in Figure 1, but showing a slightly modified form.

Referring now to Figure 2 of the drawing, it is obvious that if the basket were supported on a plane surface, it would rest on the lower end of pin 23 and one point of the bottom and would therefore be in unstable equilibrium; when supported on such a plane surface the basket will rock very readily about the head of the pin. The bottom of the basket can be either convex as shown, or its curvature may be decreased so as to approach a plane. The basket portion 13 is provided in its top and sides with a number of perforations which have been indicated in a general way and designated by reference numeral 25. These perforations must be of sufficient size to permit the water to pass freely through the wall and should not be so large that any appreciable amount of coffee grains will pass outwardly. Within these limits, the perforations may be of any desired size.

In Figure 2, a slightly modified form of construction has been shown. In the embodiment shown the closure is not provided with a depression 22, but the bottom 11a of the container 10a has a circular depression 22a in its upper surface. The spherical bottom 14a of the closure rests on the edge surrounding the depression 22a and the water for producing the steam is now contained in the depression 22a which corresponds to depression 22 in Figure 1. The weight 24 is secured in place in the same manner and by the same means shown in Figure 1. The modification shown in Figure 2 is a reversal of that shown in Figure 1 and the two embodiments operate in substantially the same way.

In Figures 1 and 2, the basket portion 13 is secured to the lower end of the handle, while the closure forms the bottom of the coffee maker in its operative position. This arrangement is believed to be more convenient than the one that is shown in Figure 3 and which will now be described, as the basket can be held by the handle while being filled and while being washed.

Figure 3:
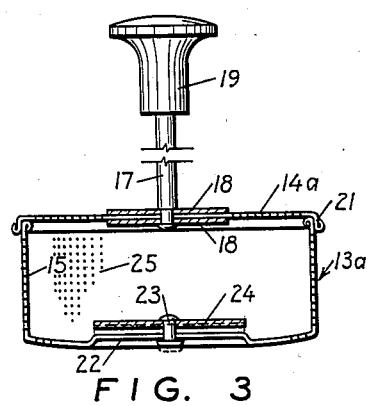
Figure 3 is a diametrical section of the coffee maker or basket showing the closure positioned at the top thereof.

In Figure 3 a modification has been shown in which the basket 13a is positioned below the closure which has been designated by reference numeral 14a. The bottom of the basket is slightly spherical and is provided with an upwardly or inwardly extending depression 22 corresponding to the similarly numbered depression in Figure 1.

Figure 4:
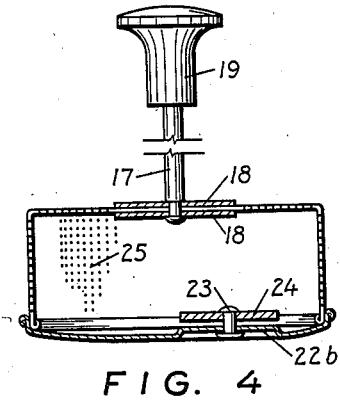
Figure 4 is a section similar to that shown in Figure 1, but showing the depressed area in the bottom eccentrically positioned.
Figure 5:
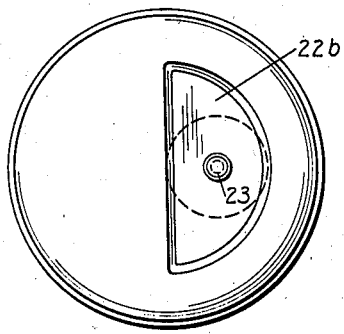
Figure 5 is a bottom plan view of the closure shown in Figure 4.

In Figures 1 and 3, the depression 22 has been shown as concentric with respect to the basket. This is not an essential and it is possible to position the depression eccentrically in the manner shown in Figures 4 and 5 where it has been designated by reference numeral 22b.

Figure 6:
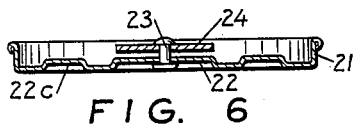
Figure 6 is a diametrical section through a basket closure showing a slight modification thereof.
Figure 8:
Figure 8 is a diametrical section taken on line 8—8, Figure 7, and shows a still further modification.
Figure 7:
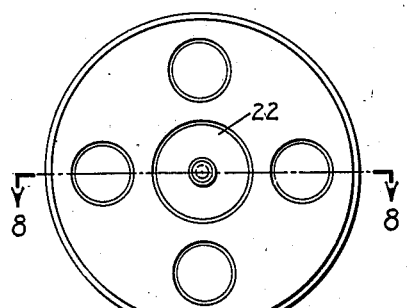
Figure 7 is a bottom plan view of the closure shown in Figure 8.

In Figure 6 a cross section through a closure has been shown in which, in addition to the center depression 22, there is an annular depression 22c and in Figures 7 and 8 another modification has been shown in which the bottom of the closure is provided with a plurality of depressions which may be arranged systematically as shown or in any other way. Each of these depressions may have an agitating weight, or only a single weight may be employed, as may be found most desirable.

It is evident that the bottom of the coffee maker which rests on the bottom of the liquid container can be formed in many specifically different ways and have one or more depressions and it is also evident that the depression, instead of being in the coffee maker, may be in the bottom of the container as shown in Figure 2. In any event it is necessary that there shall be a water pocket between the bottom of the container and the bottom of the coffee maker so that water will be trapped for the generation of steam by which the moving or rocking action will be effected.

Although that portion of the basket bottom which supports the weight 24 has been shown as imperforate, it is permissible to provide it with at least some perforations since the generation of steam in the pocket takes place so fast that it will produce the desired rocking effect, even when some escapes into the basket.

It is also possible to suspend the weight 24 instead of supporting it as shown and in case it is suspended it will have a pendulum action that causes agitation.

Having described the invention what is claimed as new is:

1. A coffee maker comprising, a basket formed in part of perforated material having a bottom adapted to rest on a supporting surface and provided with at least one depressed area forming a water pocket, whereby when the basket is seated on a heated supporting surface and immersed in water, steam escaping from the pocket will rock the basket, a combined pendulum and handle extending upwardly from the basket, and a stabilizing weight attached to the bottom of the basket, at the center thereof.

2. A coffee maker comprising a basket formed in part of perforated material, the under surface of its bottom having a depressed area forming a water pocket, whereby when the basket is positioned on a heated surface and immersed in water, steam escaping from the pocket will cause the basket to rock, an agitator positioned in the basket, and means for moving the agitator each time the basket rocks.

3. A coffee maker comprising a basket formed in part of perforated material having the under surface of its bottom provided with at least one depressed area forming a water pocket whereby when the basket is positioned on a heated surface and immersed in water, steam escaping from the pocket will cause the basket to rock, an agitator positioned in the basket, means for moving the agitator each time the basket rocks, and a combined handle and pendulum extending upwardly from the vessel.

4. A coffee maker comprising, a basket, formed in part of perforated material, having a bottom whose under surface is slightly spherical, with the exception of a portion of the area of the bottom surface which is offset upwardly to provide a depression forming a water pocket when the basket is positioned on the upper surface of a supporting member and immersed in water, whereby steam generated in the pocket will cause the basket to rock as the steam escapes.

5. A coffee maker comprising a basket, formed in part of perforated material, the bottom of the basket having at least one depressed area which forms a water pocket, whereby when the basket is seated on a heated surface and immersed in water, steam generated in and escaping from the pocket will cause the basket to rock, an agitator element positioned within the basket and normally supported on the upper surface of the bottom thereof above the pocket, the bottom having a hole, a headed pin positioned with its head in the depressed area, the other end of the pin being secured to the agitator, the length of the pin being such that the head will project below the bottom when the agitator rests on the upper surface thereof whereby the agitator will be raised and lowered as the basket rocks.

6. A coffee maker comprising a container having a bottom, a perforated basket positioned therein and resting on the bottom thereof, one of the contacting surfaces having a depression forming a water pocket whereby when the water in the pocket is heated to a temperature sufficient to liberate gases, the escaping gases will rock the basket, thereby agitating its contents, a stabilizing weight attached to the bottom of the basket and means attached to the weight and projecting through the wall of the basket for moving the weight each time the basket rocks.

7. A coffee maker comprising, a basket, formed in part of perforated material, having a bottom whose under surface is convex, with the exception of a portion of the area thereof which is offset upwardly to provide a water pocket when the basket is positioned on the upper surface of a supporting member and immersed in water, whereby steam generated in the pocket will cause the basket to rock as the steam escapes, and a combined pendulum and handle extending upwardly from the basket.

8. A coffee maker comprising, a basket, formed in part of perforated material, having a bottom whose under surface is convex, with the exception of a portion of the area thereof which is offset upwardly to provide a water pocket when the basket is positioned on the upper surface of a supporting member and immersed in water, whereby steam generated in the pocket will cause the basket to rock as the steam escapes, and a stabilizing weight secured to the inside of the bottom adjacent the center thereof.

9. A coffee maker comprising, a basket, formed in part of perforated material, having a bottom whose under surface is convex, with the exception of a portion of the area thereof which is offset upwardly to provide a water pocket when the basket is positioned on the upper surface of a supporting member and immersed in water, whereby steam generated in the pocket will cause the basket to rock as the steam escapes, and an agitator positioned in the basket and movably connected with the bottom thereof.

ARTHUR B. LOW.